L. Wetmore,
Cage Trap,
No. 24,771.           Patented July 12, 1859.
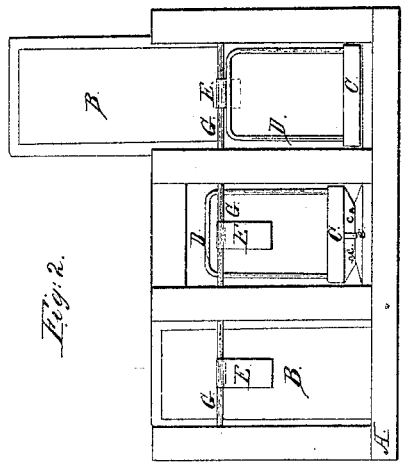
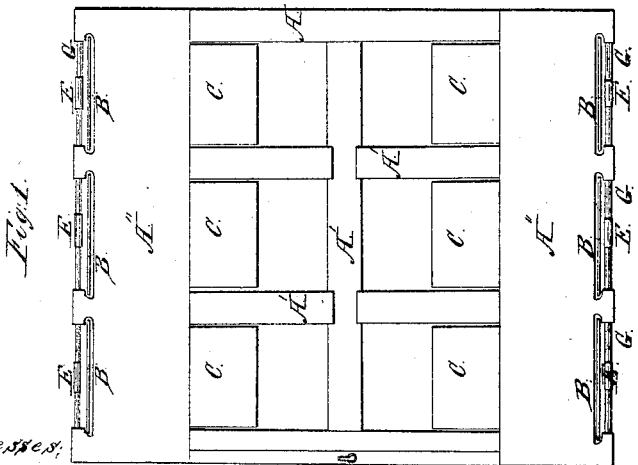
Witnesses:
A. P. Donaldson
H. T. Bailey
Inventor:
Loven Wetmore

UNITED STATES PATENT OFFICE.

LOREN WETMORE, OF ELK, PENNSYLVANIA.

TRAP FOR ANIMALS.

Specification of Letters Patent No. 24,771, dated July 12, 1859.

*To all whom it may concern:*

Be it known that I, LOREN WETMORE, of Elk, in the county of Tioga and State of Pennsylvania, have invented a new and useful Improvement in Traps for Animals; and I do hereby declare that the following is a full and exact description thereof, reference being had to the accompanying drawings and to the letters of reference marked thereon.

My invention consists in a very simple cheap and efficient trap, and in a peculiar arrangement for springing the trap.

In the accompanying drawings: Figure 1 represents a top view of my trap. Fig. 2, is an end view, showing the trap in different positions, as set and as sprung.

In the construction of my trap I first make a suitable box A, which may be divided into several compartments by partitions A'. The top of this box is partly covered by two boards, A'', and the space between these boards is occupied by a plate of glass which is capable of sliding out and in at pleasure. Each of the compartments of this box forms a complete trap, or the whole is a manifold trap. The entrance to these compartments is seen in Fig. 2, where the drop or sliding door B, of one of the compartments is elevated and the trap set. On the bottom of each compartment is a trip C, the center of which rests on two fulcra $c$, Fig. 2, so as easily to rock backward and forward. This trip has a guide pin $e$, Fig. 2. When the trap is set, the end of the trip C rests on the bottom of the box, as shown in Fig. 2, on the right hand side. Into the trip C, is inserted an arched wire D, near the entrance of the trap; in front of this wire and of the drop B is a catch E, which is hung upon a wire G, so as to revolve easily.

In setting the trap the drop B is raised entirely above the wires D and G, and the catch E is elevated so as to bring its free end upon the arch of wire D; then the drop B is brought down and allowed to rest on the catch E as seen in Fig. 2 at the right hand. Now an animal in entering the trap steps upon the trip C, the outer end of which rests firmly upon the floor of the trap. As the animal passes beyond the fulcra $c$, the trip is gently tilted inward (as seen in the middle compartment of Fig. 2 where the arch of wire D has risen above the wire G,) and the drop B instantly falls. The animal, on finding himself caught, is attracted from the door by the light from the window above, and therefore makes no effort to escape by the drop or door B. Moreover the window light makes the animal less cautious about entering the trap, and allows also convenient inspection of the entrapped game. By this simple construction of trap several animals may be caught at the same time.

The number of compartments may be varied and also the construction of parts without departing from my invention.

I am aware that several traps have been made in one and that traps have been made with drops and windows, but I believe that my peculiar construction of trap is new.

Having thus fully described my invention, what I claim and desire to secure by Letters Patent of the United States is:

1. The peculiar construction and arrangement of the manifold trap, substantially as set forth.

2. I claim the arrangement of the trip C, provided with a fulcrum or fulcra $c$, guide pin $e$, and arched wire D for operating the trap, substantially as set forth.

LOREN WETMORE.

Witnesses:
A. N. DONALDSON,
W. D. BAILEY.